US012626947B2

(12) United States Patent
Kim

(10) Patent No.: US 12,626,947 B2
(45) Date of Patent: May 12, 2026

(54) LAMINATION APPARATUS INCLUDING PRESSING ROLL CONFIGURED SUCH THAT PRESSING FORCE THEREOF IS ADJUSTABLE AND ELECTRODE ASSEMBLY MANUFACTURED USING THE SAME

(71) Applicant: LG Energy Solution, Ltd., Seoul (KR)

(72) Inventor: Dong Ha Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 709 days.

(21) Appl. No.: 17/920,247

(22) PCT Filed: Jan. 28, 2022

(86) PCT No.: PCT/KR2022/001614
§ 371 (c)(1),
(2) Date: Oct. 20, 2022

(87) PCT Pub. No.: WO2022/169237
PCT Pub. Date: Aug. 11, 2022

(65) Prior Publication Data
US 2023/0187679 A1 Jun. 15, 2023

(30) Foreign Application Priority Data
Feb. 5, 2021 (KR) ........................ 10-2021-0016895

(51) Int. Cl.
*H01M 10/04* (2006.01)
*H01M 50/46* (2021.01)

(52) U.S. Cl.
CPC ....... *H01M 10/0404* (2013.01); *H01M 50/46* (2021.01)

(58) Field of Classification Search
CPC ........................... H01M 10/0404; H01M 50/46
(Continued)

(56) References Cited

U.S. PATENT DOCUMENTS 9,246,186 B2 1/2016 Ku et al.
2014/0154565 A1* 6/2014 Ku ...................... H01M 50/461
429/246
(Continued)

FOREIGN PATENT DOCUMENTS

CN 103959539 A 7/2014
CN 105190957 A 12/2015
(Continued)

OTHER PUBLICATIONS

Edalati et al. (2006). The use of radiography for thickness measurement and corrosion monitoring in pipes. International Journal of Pressure Vessels and Piping, 83, 736-741 (Year: 2006).*
(Continued)

*Primary Examiner* — Allison Bourke
*Assistant Examiner* — Robert Gene West
(74) *Attorney, Agent, or Firm* — Lerner David LLP

(57) ABSTRACT

The present invention relates to a lamination apparatus for manufacture of an electrode assembly, and more particularly to a lamination apparatus including a pressing roll configured to press electrodes constituting the electrode assembly, a rotary shaft configured to rotate the pressing roll, a pressing cylinder configured to adjust pressing force applied to the pressing roll, and a thickness measurement sensor configured to measure the thickness of one of the electrodes, whereby it is possible to secure the force of adhesion between the electrodes constituting the electrode assembly even though there is deviation in thickness between electrode mixture layers.

9 Claims, 6 Drawing Sheets

(58) Field of Classification Search
USPC ........................................................ 429/246
See application file for complete search history.

(56)                    References Cited

U.S. PATENT DOCUMENTS

2015/0333310 A1 * 11/2015 Choi ................... H01M 50/451
                                                              429/145
2016/0276712 A1     9/2016 Sale et al.
2017/0133705 A1     5/2017 Niwa et al.
2019/0273279 A1 *   9/2019 Sale .................. H01M 10/0459
2020/0067068 A1 *   2/2020 Lee ................... H01M 10/0585

FOREIGN PATENT DOCUMENTS

JP           2574699  B2 *  1/1997
JP        2001332248  A     11/2001
JP           4852846  B2     1/2012
JP        2014-191880 A     10/2014
KR        20110074375 A      6/2011
KR        101145840  B1      5/2012
KR        20130142017 A  * 12/2013  ....... H01L 21/67132
KR        20140004573 A      1/2014
KR        20150134310 A     12/2015
KR        101586121  B1      1/2016
KR        20160085812 A      7/2016
KR        20160143587 A     12/2016
KR        101726785  B1      4/2017
KR        20180044769 A      5/2018
KR        20180085132 A      7/2018
KR        101962526  B1      3/2019
KR        10-2028611 B1     10/2019
KR        20200066901 A  *  6/2020   .......... H01M 10/058

OTHER PUBLICATIONS

Extended European Search Report including Search Opinion from 22749986.0, dated Aug. 8, 2024, pp. 1-9.
Search Report dated Apr. 18, 2025 from the Office Action for Chinese Application No. 202280003448.1 Issued Apr. 22, 2025, pp. 1-3.
International Search Report for Application No. PCT/KR2022/001614 mailed May 10, 2022, pp. 1-3.

* cited by examiner

【FIG. 1】
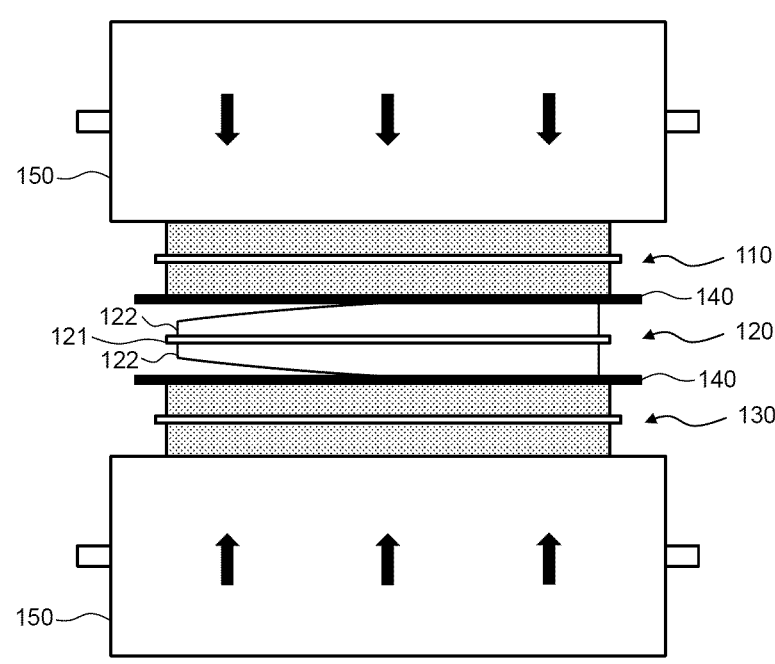
【FIG. 2】
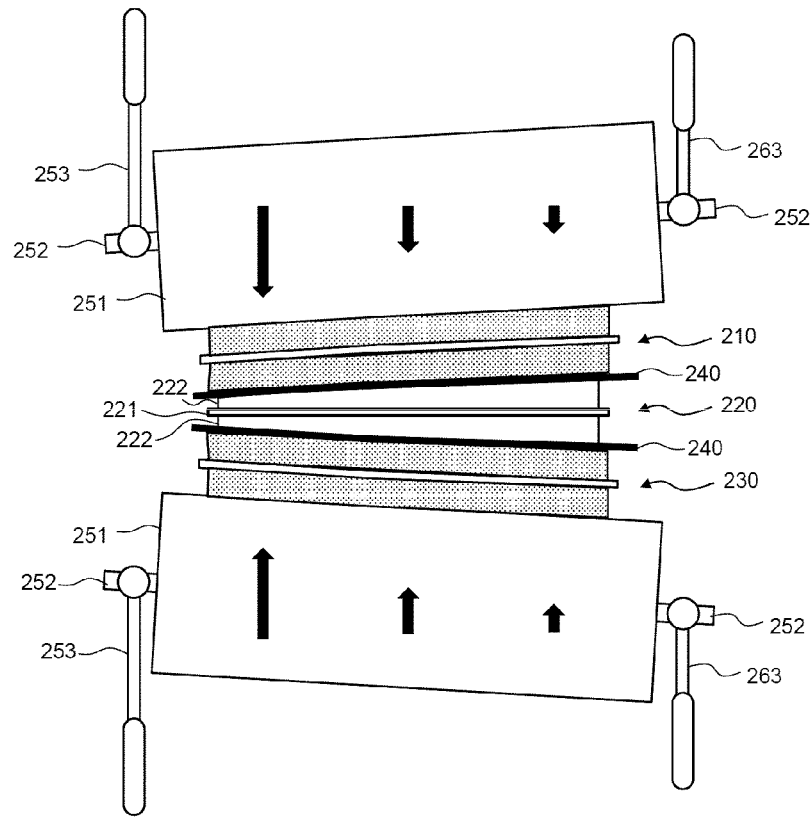

【FIG. 3】
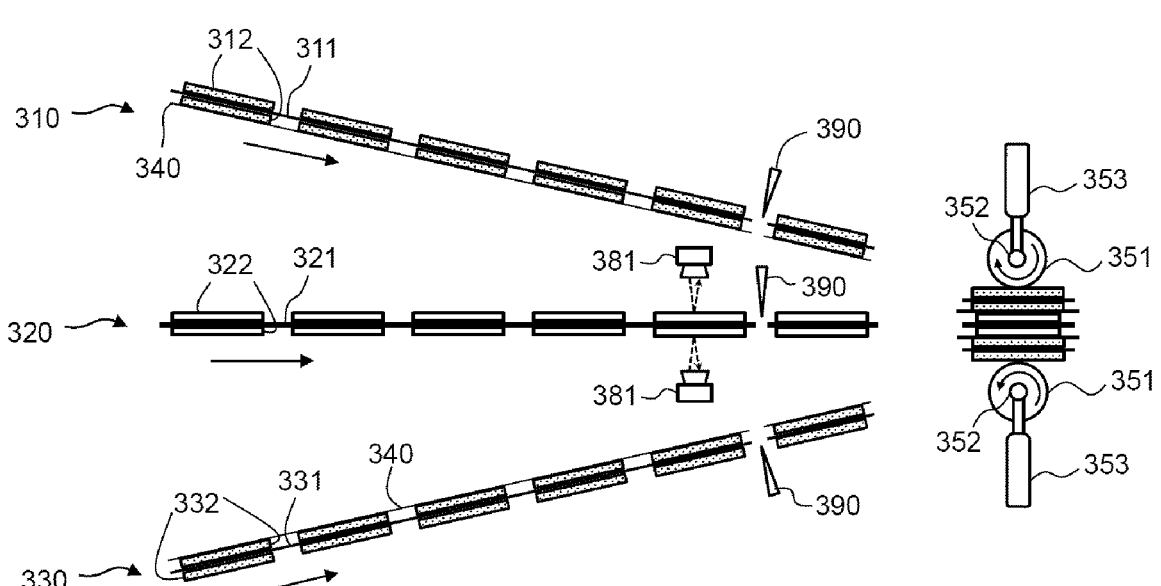

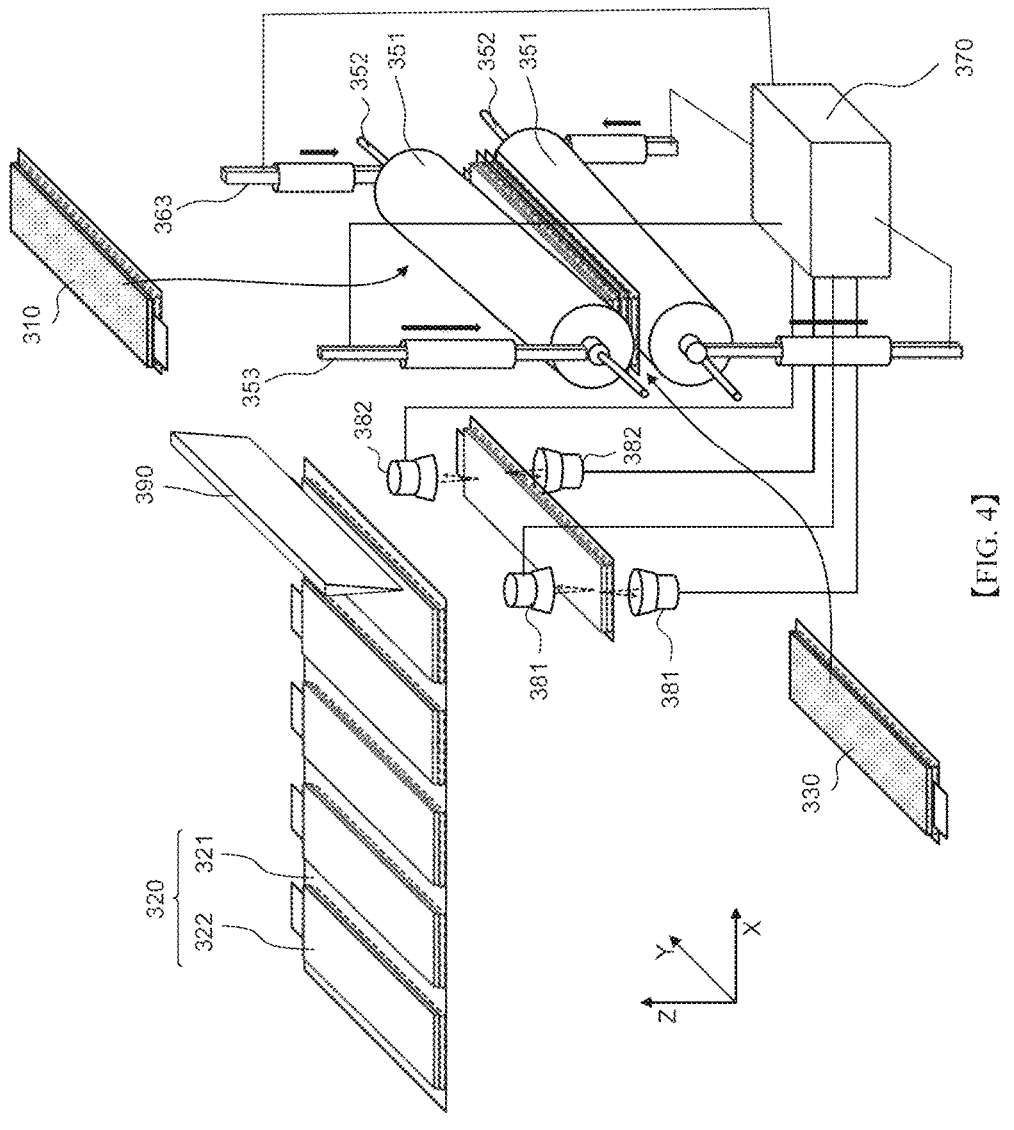
[FIG. 4]

【FIG. 5】
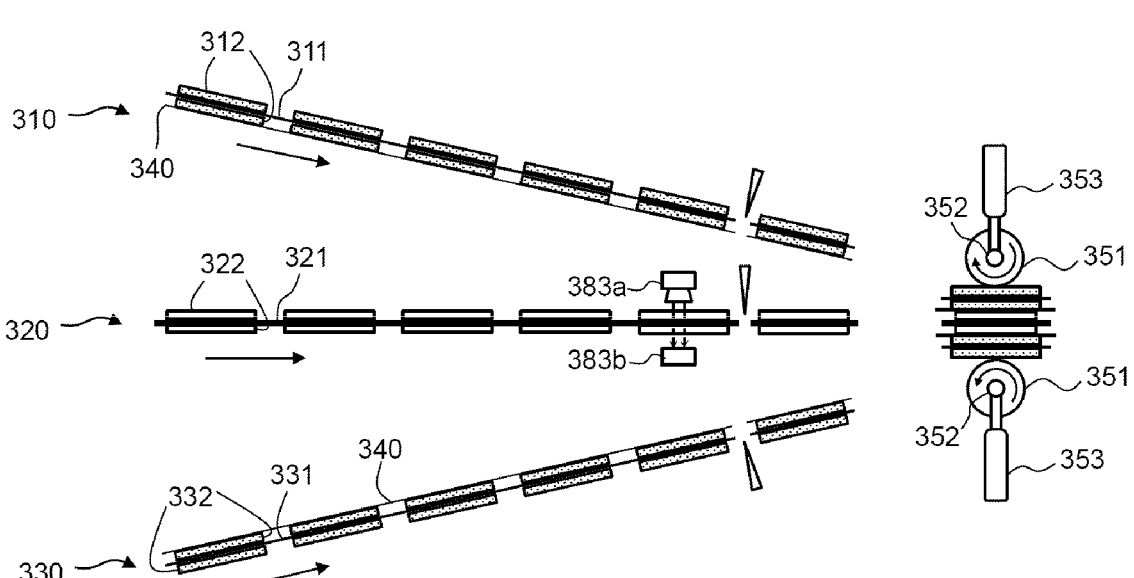

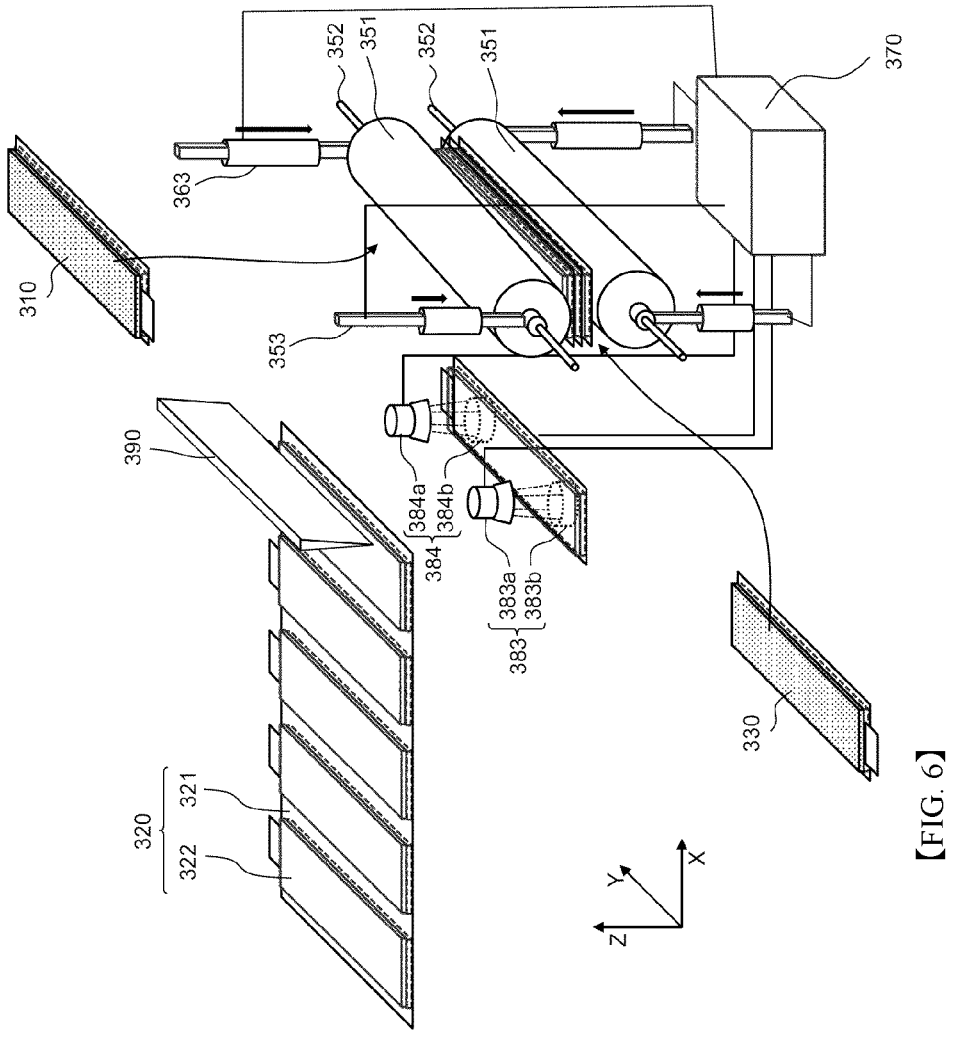
[FIG. 6]

【FIG. 7】
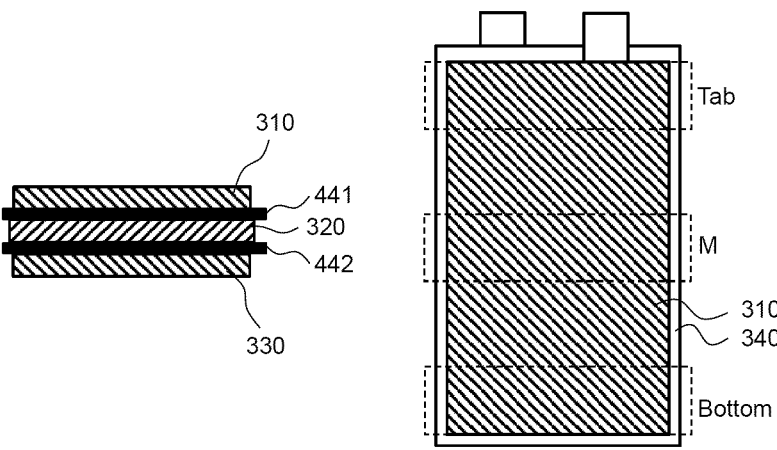

LAMINATION APPARATUS INCLUDING PRESSING ROLL CONFIGURED SUCH THAT PRESSING FORCE THEREOF IS ADJUSTABLE AND ELECTRODE ASSEMBLY MANUFACTURED USING THE SAME

CROSS-REFERENCE TO RELATED APPLICATIONS

This application is a national stage entry under 35 U.S.C. § 371 of International Application No. PCT/KR2022/001614, filed on Jan. 28, 2022, which claims priority to Korean Patent Application No. 10-2021-0016895, filed on Feb. 5, 2021, the disclosures of which are hereby incorporated herein by reference in their entireties.

TECHNICAL FIELD

The present invention relates to a lamination apparatus including a pressing roll configured such that pressing force thereof is adjustable and an electrode assembly manufactured using the same. More particularly, the present invention relates to a lamination apparatus including a pressing roll configured such that pressing force thereof is adjustable in order to prevent non-uniform force of adhesion between electrodes constituting a bi-cell due to deviation in thickness between the electrodes and an electrode assembly manufactured using the same.

BACKGROUND ART

With acceleration in capacity increase and energy density improvement of a lithium secondary battery, the lithium secondary battery has been used as an energy source for medium and large devices, such as a vehicle or a power storage system, as well as small devices, such as a portable electronic device.

The lithium secondary battery may be manufactured using a method of receiving an electrode assembly, configured to have a structure in which a positive electrode, a separator, and a negative electrode are sequentially stacked, in a battery case and hermetically sealing the battery case.

The electrode assembly includes a single-cell configured to have a structure in which a first electrode and a separator are stacked, a mono-cell configured to have a structure in which a first electrode, a separator, a second electrode, and a separator are stacked, and a bi-cell configured to have a structure in which a first electrode, a separator, a second electrode, a separator, and a third electrode are stacked.

Each of the electrodes constituting the electrode assembly is manufactured by applying an electrode mixture to one surface or opposite surfaces of a thin current collector made of copper, aluminum, or nickel and drying and pressing the same.

The electrodes thus manufactured go through the process of stacking and laminating the electrodes in the state in which a separator is interposed therebetween such that the electrodes are coupled to each other. When there occurs deviation in thickness between electrode mixture layers applied to the electrodes, however, the electrodes may be non-uniformly coupled to each other.

In connection therewith, FIG. 1 is a view showing a bi-cell lamination process using a conventional lamination apparatus.

Referring to FIG. 1, an electrode assembly is a bi-cell configured such that a first electrode 110, a separator 140, a second electrode 120, a separator 140, and a third electrode

130 are sequentially stacked. The thicknesses of electrode mixture layers 122 applied to opposite surfaces of an electrode current collector 121 of the second electrode 120 are not uniform. The left-side thickness of each of the electrode mixture layers is small, and the right-side thickness of each of the electrode mixture layers is large.

A pair of pressing rolls 150 is disposed above the first electrode 110 and under the third electrode 130 to press the electrode assembly. At this time, the pressing rolls 150 apply uniform pressure to the entireties of the surfaces of the first electrode 110 and the third electrode 130 that abut the pressing rolls. As a result, it is difficult for the left sides of the electrode mixture layers 122 of the second electrode to be brought into tight contact with the left side of the first electrode and the left side of the third electrode 130.

If adhesion is not achieved at an interface between the electrodes, as described above, non-uniform degradation of the electrodes may be caused, and lithium ions have difficulty moving, whereby resistance may be increased, and therefore performance of a lithium secondary battery may be lowered.

Also, in a production process to manufacture a stacked and folded type electrode assembly, bi-cells must be disposed on a long sheet type separation film one by one, and an electrode separated from one bi-cell may be disposed together with another bi-cell.

Such a problem may occur due to poor adhesion between the first electrode and the second electrode and between the third electrode and the second electrode when the thickness of the second electrode disposed at the middle, among the electrodes constituting the bi-cell, is non-uniform.

Therefore, there is a need for technology capable of securing the force of coupling between all electrodes constituting a bi-cell when the thickness of an electrode mixture layer of the second electrode disposed at the middle, among the electrodes, is non-uniform.

DISCLOSURE

Technical Problem

The present invention has been made in view of the above problems, and it is an object of the present invention to provide a, lamination apparatus including a pressing roll configured such that pressing force thereof is adjustable in order to prevent decrease in force of adhesion between electrodes due to deviation in thickness between electrode mixture layers constituting a bi-cell and an electrode assembly manufactured using the same.

Technical Solution

A lamination apparatus according to the present invention to accomplish the above object, which is a lamination apparatus for manufacture of an electrode assembly, includes a pressing roll configured to press electrodes constituting the electrode assembly, a rotary shaft configured to rotate the pressing roll, a pressing cylinder configured to adjust pressing force applied to the pressing roll, and a thickness measurement sensor configured to measure the thickness of an electrode mixture layer.

In the lamination apparatus according to the present invention, the pressing cylinder may include a first pressing cylinder and a second pressing cylinder coupled to opposite ends of the rotary shaft, respectively.

In the lamination apparatus according to the present invention, pressing force applied by the first pressing cylinder and pressing force applied by the second pressing cylinder may be different from each other.

In the lamination apparatus according to the present invention, the thickness measurement sensor may include a first thickness measurement sensor and a second thickness measurement sensor disposed at opposite ends of the electrode, respectively.

The lamination apparatus according to the present invention may further include a controller configured to control the pressing force of the pressing cylinder when a difference occurs between the thickness of the electrode measured by the first thickness measurement sensor and the thickness of the electrode measured by the second thickness measurement sensor.

In the lamination apparatus according to the present invention, the pressing roll may more strongly press the electrode at the position at which the thickness of the electrode is smaller when a difference occurs between the thickness of the electrode measured by the first thickness measurement sensor and the thickness of the electrode measured by the second thickness measurement sensor.

In the lamination apparatus according to the present invention, the electrode assembly may be a bi-cell configured to have a structure in which a first electrode, a separator, a second electrode, a separator, and a third electrode are stacked.

The lamination apparatus according to the present invention may further include a first electrode supply unit, a second electrode supply unit, and a third electrode supply unit, wherein the thickness measurement sensor may measure the thickness of a second electrode supplied from the second electrode supply unit.

In the lamination apparatus according to the present invention, each of the electrodes may be a double-sided electrode having electrode mixtures formed on opposite surfaces of an electrode current collector by coating, and the lamination apparatus may be disposed at each of an upper surface and a lower surface of the electrode.

In the lamination apparatus according to the present invention, the thickness measurement sensor may include a radiation portion configured to radiate a beta ray capable of being transmitted through the electrode and a receiving portion configured to sense the beta ray radiated by the radiation portion, and the radiation portion may be disposed at any one of the upper surface and the lower surface of the electrode while the receiving portion may be disposed at the other.

In the lamination apparatus according to the present invention, pressing forces applied to a first end and a second end of the upper pressing roll disposed at the upper surface of the electrode may be set independent of pressing forces applied to a first end and a second end of the lower pressing roll disposed at the lower surface of the electrode.

In the lamination apparatus according to the present invention, the pressing roll may be configured to be capable of being heated.

The present invention provides an electrode assembly manufactured using the lamination apparatus. Specifically, the electrode assembly may be a bi-cell configured to have a structure in which a first electrode, a separator, a second electrode, a separator, and a third electrode are sequentially stacked, and the first electrode and the second electrode may be coupled to each other, and the second electrode and the third electrode may be coupled to each other, throughout outer peripheries thereof.

In addition, the present invention may provide various combinations of the above solving means.

Advantageous Effects

As is apparent from the above description, in the present invention, it is possible to adjust pressing force of a pressing roll configured to press a bi-cell, and therefore it is possible to secure the force of adhesion between electrodes by increasing the pressing force of the pressing roll at a part of an electrode mixture layer at which the thickness thereof is small.

In addition, it is possible to measure the thickness of an electrode mixture layer of a second electrode of the bi-cell, which is located at a middle thereof, using a thickness measurement sensor, whereby it is possible to form an adhesive surface throughout an interface between a first electrode and a separator and an interface between the separator and the second electrode.

In addition, it is possible to individually adjust pressing forces applied to a pressing roll disposed above the first electrode of the bi-cell and a pressing roll disposed under a third electrode by a first pressing cylinder and a second pressing cylinder coupled to opposite ends of rotary shafts of the pressing rolls, whereby it is possible to secure the force of adhesion between the first electrode and the second electrode and between the third electrode and the second electrode even though there is deviation in thickness between electrode mixture layers formed on opposite surfaces of the second electrode.

In addition, the pressing roll is configured such that the temperature of the pressing roll can be increased, whereby it is possible to further increase the force of adhesion between the electrodes.

Since the force of adhesion between the electrodes is secured, as described above, it is possible to provide a battery cell having low resistance. In addition, non-uniform degradation of the electrode assembly is prevented, whereby it is possible to provide a battery cell having increased lifespan.

In addition, bi-cells may be disposed on a separation sheet one by one when a stacked and folded type electrode assembly is manufactured, whereby it is possible to reduce incorrect bi-cell placement, and therefore it is possible to secure productivity of the electrode assembly.

DESCRIPTION OF DRAWINGS

FIG. 1 is a view showing a bi-cell lamination process using a conventional lamination apparatus.

FIG. 2 is a front view showing the state in which a bi-cell is laminated using a lamination apparatus according to the present invention.

FIG. 3 is a side view showing the state in which a bi-cell is laminated using a lamination apparatus according to an embodiment.

FIG. 4 is a perspective view showing the state in which a controller is added to the lamination apparatus of FIG. 3.

FIG. 5 is a side view showing the state in which a bi-cell is laminated using a lamination apparatus according to another embodiment.

FIG. 6 is a perspective view showing the state in which a controller is added to the lamination apparatus of FIG. 5.

FIG. 7 is a vertical sectional view and a plan view of a bi-cell manufactured according to Experimental Example.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

FIG. 2 is a front view showing the state in which a bi-cell is laminated using a lamination apparatus according to the present invention.

Referring to FIG. 2, pressing rolls 251 are disposed above and under an electrode assembly.

The electrode assembly is a bi-cell configured such that a first electrode 210, a separator 240, a second electrode 220, a separator 240, and a third electrode 230 are sequentially stacked. The first electrode 210 and the third electrode 230 are electrodes having the same polarity, and the second electrode 220 is an electrode having a polarity different from the polarity of the first electrode 210 and the third electrode 230.

Each of the first electrode 210, the second electrode 220, and the third electrode 230 is a double-sided electrode having electrode mixture layers applied to opposite surfaces of an electrode current collector.

The thickness of each of the electrode mixture layers 222 applied to the upper surface and the lower surface of the electrode current collector 221 of the second electrode 220 is not uniform. The left-side thickness of each of the electrode mixture layers is relatively small, and the right-side thickness of each of the electrode mixture layers is relatively large.

In this case, when the electrode assembly is pressed in the state in which rotary shafts 252 of the pressing rolls 251 are disposed parallel to each other, as shown in FIG. 1, it is difficult to remove a gap between the first electrode 210 and the second electrode 220 and a gap between the third electrode 230 and the second electrode 220 at the left side, at which the thickness of each of the electrode mixture layers 222 is relatively small. As a result, non-adhered portions may occur at left parts of the first electrode 210 and the second electrode 220 and left parts of the third electrode 230 and the second electrode 220.

In the present invention, therefore, a first pressing cylinder 253 and a second pressing cylinder 263 configured to be independently controlled are coupled to opposite ends of each of the rotary shafts 252, which are configured to rotate the pressing rolls 251.

Specifically, pressing force applied by the first pressing cylinder 253 and pressing force applied by the second pressing cylinder 263 may be different from each other. The first pressing cylinder 253 is located so as to be adjacent to the part at which the thickness of each of the electrode mixture layers is relatively small, and the second pressing cylinder 263 is located so as to be adjacent to the part at which the thickness of each of the electrode mixture layers is relatively large.

When the pressing force applied by the first pressing cylinder 253 is greater than the pressing force applied by the second pressing cylinder 263, the first electrode 210 and the third electrode 230 may be deeply pressed in a direction toward the second electrode 220. Consequently, it is possible to completely adhere the electrodes to each other at the left part, at which the thickness of each of the electrode mixture layers 222 is relatively small as well as the right part, at which the thickness of each of the electrode mixture layers 222 is relatively large.

FIG. 3 is a side view showing the state in which a bi-cell is laminated using a lamination apparatus according to an embodiment, and FIG. 4 is a perspective view showing the state in which a controller is added to the lamination apparatus of FIG. 3.

Referring to FIGS. 3 and 4, the lamination apparatus according to the present invention, which is configured to manufacture a bi-cell, includes a pressing roll 351 configured to press electrodes constituting an electrode assembly, a rotary shaft 352 configured to rotate the pressing roll 351, a first pressing cylinder 353 and a second pressing cylinder 363 configured to adjust pressing force applied to the pressing roll 351, and a first thickness measurement sensor 381 and a second thickness measurement sensor 382 configured to measure the thickness of one of the electrodes.

The lamination apparatus includes a first electrode supply unit configured to supply a first electrode 310, a second electrode supply unit configured to supply a second electrode 320, and a third electrode supply unit configured to supply a third electrode 330, and the thickness measurement sensors measure the thickness of the second electrode 320 supplied from the second electrode supply unit.

The electrode assembly is a bi-cell configured such that the first electrode 310, a separator 340, the second electrode 320, a separator 340, and the third electrode 330 are sequentially stacked. The first electrode 310 is configured such that electrode mixture layers 312 are formed on opposite surfaces of an electrode current collector 311, the second electrode 320 is configured such that electrode mixture layers 322 are formed on opposite surfaces of an electrode current collector 321, and the third electrode 330 is configured such that electrode mixture layers 332 are formed on opposite surfaces of an electrode current collector 331.

The first electrode 310 and the third electrode 330 are electrodes having the same polarity, and the second electrode 320 is an electrode having a polarity different from the polarity of the first electrode 310 and the third electrode 330. That is, when the first electrode and the third electrode are positive electrodes, the second electrode is a negative electrode. When the first electrode and the third electrode are negative electrodes, the second electrode is a positive electrode.

The separator 340 is attached to an outer surface of the electrode mixture layer 312 of the first electrode 310 that faces the second electrode 320, and the first electrode 310 and the separator 340 are cut into a unit electrode by a cutter 390 in a step before lamination.

The separator 340 is attached to an outer surface of the electrode mixture layer 332 of the third electrode 330 that faces the second electrode 320, and the third electrode 330 and the separator 340 are cut into a unit electrode by a cutter 390 in the step before lamination.

No separator 340 is attached to an outer surface of the electrode mixture layer 322 of the second electrode 320, and the second electrode 320 is cut into a unit electrode by a cutter 390 in the step before lamination.

The pressing cylinders include a first pressing cylinder 353 and a second pressing cylinder 363 coupled to opposite ends of the rotary shaft 352, respectively, and the pressing cylinders may be individually controlled such that pressing forces applied to the pressing roll are different from each other.

The thickness of the electrode mixture layer 322 of the second electrode 320 may not be uniform. The first thickness measurement sensor 381 and the second thickness measurement sensor 382, which are configured to measure the thickness of the electrode mixture layer, are disposed at opposite ends of the second electrode 320, respectively. Specifically, the first thickness measurement sensor 381 and the second thickness measurement sensor 382 are disposed respectively at opposite ends of the second electrode in a y-axis direction, which is perpendicular to a movement direction x of the electrode.

In order to secure the force of adhesion between the electrodes constituting the bi-cell, the size of a gap between the first electrode and the second electrode and the size of a gap between the third electrode and the second electrode may be recognized when thickness deviation of the second electrode is recognized. Consequently, it is important to check thickness deviation of the second electrode.

Each of the first thickness measurement sensor 381 and the second thickness measurement sensor 382 may be constituted by a pair of an upper sensor located above the second electrode and a lower sensor located under the second electrode. A beta ray emitted from the lower sensor is transmitted through the second electrode and reaches the upper sensor. When the loading amount of the electrode mixture layer of the second electrode is larger, the residual amount of the beta ray that reaches the upper sensor is smaller. Consequently, it is possible to measure the thickness of the electrode mixture layer of the second electrode by the principle by which the loading amount of the electrode mixture layer is calculated based on the residual amount of the beta ray measured by the upper sensor.

When a difference occurs between the thickness of the electrode mixture layer measured by the first thickness measurement sensor 381 and the thickness of the electrode mixture layer measured by the second thickness measurement sensor 382, a difference occurs between pressing force applied by the first pressing cylinder 353 and pressing force applied by the second pressing cylinder 363. The pressing cylinder located at the side at which the thickness of the electrode mixture layer is smaller applies stronger pressing force to the pressing roll. As a result, the parts of the first electrode and the third electrode adjacent to the small thickness part of the electrode mixture layer of the second electrode may be more deeply pressed in a direction toward the second electrode, and therefore the force of adhesion between the first electrode and the second electrode and the force of adhesion between the third electrode and the second electrode may be increased.

In a concrete example, the lamination apparatus may include a controller 370 configured to control pressing forces of the first pressing cylinder 353 and the second pressing cylinder 363 based on the thicknesses of the electrode mixture layer measured by the first thickness measurement sensor 381 and the second thickness measurement sensor 382. Consequently, it is possible to calculate values measured through the first thickness measurement sensor and the second thickness measurement sensor in real time, whereby it is possible to adjust the pressing forces of the pressing cylinders without intervention of a worker.

For example, the first thickness measurement sensor 381 and the second thickness measurement sensor 382 may be disposed above an electrode that enters the cutter 390, as shown in FIG. 3, or may be disposed between the cutter 390, which cuts an electrode sheet into a unit electrode, and the pressing roll, as shown in FIG. 4.

In another concrete example, the first thickness measurement sensor 381 and the second thickness measurement sensor 382 may be disposed at an upper surface and a lower surface of the second electrode 320. Consequently, it is possible to measure the thicknesses of opposite ends of the electrode mixture layer 322 applied to the upper surface of the second electrode 320 in the y-axis direction and to measure the thicknesses of opposite ends of the electrode mixture layer 322 applied to the lower surface of the second electrode 320 in the y-axis direction.

That is, it is possible to measure deviation in thickness between the electrode mixture layers applied to the upper surface and the lower surface of the second electrode 320, whereby it is possible to accurately measure the gap between the first electrode 310 and the second electrode 320 and the gap between the third electrode 330 and the second electrode 320. The pressing forces of the first pressing cylinder 353 and the second pressing cylinder 363 of the lamination apparatus disposed at the upper surface of the second electrode 320 may be controlled independent of the pressing forces of the first pressing cylinder 353 and the second pressing cylinder 363 of the lamination apparatus disposed at the lower surface of the second electrode 320.

Consequently, pressing forces applied to a first end and a second end of the upper pressing roll disposed at the upper surface of the second electrode 320 may be set independent of pressing forces applied to a first end and a second end of the lower pressing roll disposed at the lower surface of the second electrode 320.

In FIG. 4, the first electrode 310, the second electrode 320, and the third electrode 330 are stacked between the pressing rolls 351 in the state in which separators (not shown) are interposed between the respective electrodes.

In the case of FIG. 4, the thickness of the electrode adjacent to the first pressing cylinder 353 is relatively small, whereby the pressing force of the first pressing cylinder 353 is greater than the pressing force of the second pressing cylinder 363. Consequently, the first pressing cylinder 353 and the second pressing cylinder 363 press the pressing rolls 351 so as to come into tight contact with the outermost electrodes of the bi-cell, and the pressing roll 351 adjacent to the rotary shaft 352 connected to the first pressing cylinder 353 is strongly pressed while being moved so as to come into tighter contact with the bi-cell in a direction parallel to a z-axis.

Consequently, non-adhesion between the first electrode, the second electrode, and the third electrode in the state in which the separators are interposed therebetween does not occur.

In a concrete example, the pressing rolls 351 may be configured to be capable of being heated, and therefore the pressing rolls may press the bi-cell in a heated state. Consequently, it is possible to further increase the force of adhesion between the electrodes.

FIG. 5 is a side view showing the state in which a bi-cell is laminated using a lamination apparatus according to another embodiment, and FIG. 6 is a perspective view showing the state in which a controller is added to the lamination apparatus of FIG. 5.

Referring to FIGS. 5 and 6, a construction including a first electrode 310, a second electrode 320, a third electrode 330, and a separator 340, which constitute a bi-cell, a pressing roll 351, a rotary shaft 352, a first pressing cylinder 353, and a second pressing cylinder 363 is identical to the construction shown in FIGS. 3 and 4, and therefore, a description given with reference to FIGS. 3 and 4 is equally applied thereto.

Thickness measurement sensors shown in FIGS. 5 and 6 may include a first thickness measurement sensor 383 and a second thickness measurement sensor 384 disposed respectively at opposite ends of the second electrode 320 parallel in the y-axis direction, whereby it is possible to measure the thicknesses of an electrode mixture layer 322 at positions corresponding to the opposite ends of the second electrode.

The first thickness measurement sensor 383 and the second thickness measurement sensor 384 include radiation portions 383a and 384a configured to radiate a beta ray capable of being transmitted through the second electrode 320 and receiving portions 383b and 384b configured to sense the beta ray radiated by the radiation portions 383a and 384a, respectively. The radiation portions 383a and 384a are disposed at an upper surface of the second electrode 320, and the receiving portions 383b and 384b are disposed at a lower surface of the second electrode.

Alternatively, the radiation portions and the receiving portions may be disposed at positions opposite the positions shown in the figures.

When the thickness of the second electrode is larger, the residual amount of the beta ray that reaches the receiving portions is smaller. Consequently, it is possible to measure the total thickness of the electrode mixture layers applied to the upper surface and the lower surface of the second electrode 320 using the first thickness measurement sensor 383 and the second thickness measurement sensor 384.

Alternatively, laser sensors may be disposed above and under the second electrode, and reflection time of a radiated laser may be measured, whereby the thickness of the second electrode may be measured.

When the bi-cell configured such that the first electrode, the separator, the second electrode, the separator, and the third electrode are sequentially stacked is manufactured using the lamination apparatus according to the present invention, as described above, adhesion may be achieved between the first electrode and the second electrode and between the second electrode and the third electrode throughout the outer surfaces thereof.

Hereinafter, the present invention will be described with reference to an experimental example. This experimental example is provided only for easier understanding of the present invention and should not be construed as limiting the scope of the present invention.

<Experimental Example>

A bi-cell was manufactured in order to check influence of pressing force applied when the bi-cell was laminated on the force of adhesion between electrodes and separators.

FIG. 7 is a vertical sectional view and a plan view of a bi-cell manufactured according to Experimental Example.

Referring to FIG. 7, the bi-cell is configured such that a first electrode 310, an upper separator 441, a second electrode 320, a lower separator 442, and a third electrode 330 are sequentially stacked, wherein the first electrode 310 and the third electrode 330 are positive electrodes, and the second electrode 320 is a negative electrode.

On the bi-cell thus manufactured, a first test of setting the pressing force of a pressing roll for lamination to 190 kgf and performing lamination at 90° C. and a second test of setting the pressing force of the pressing roll to 170 kgf and performing lamination at 90° C. were performed.

As shown in the plan view of the bi-cell, the bi-cell was divided into three regions in plan view.

Specifically, the bi-cell was divided into a tab portion Tab, which was a part adjacent to electrode tabs, a lower portion Bottom, which was opposite the tab portion, and a middle portion M, which was located between the tab portion and the lower portion. In each region, the forces of adhesion between (A) the second electrode 320 and the upper separator 441, (B) the second electrode 320 and the lower separator 442, (C) the first electrode 310 and the upper separator 441, and (D) the third electrode 330 and the lower separator 442 were measured.

In order to measure the force of adhesion at (A), the second electrode 320 was fixed to a horizontal plate, the first electrode 310 and the upper separator 441 were fixed to a grip type jig, and the first electrode and the upper separator were pulled vertically so as to be peeled off from the second electrode, whereby the adhesive force was measured.

In order to measure the force of adhesion at (B), the second electrode 320 was fixed to the horizontal plate, the third electrode 330 and the lower separator 442 were fixed to the grip type jig, and the third electrode and the lower separator were pulled vertically so as to be peeled off from the second electrode, whereby the adhesive force was measured.

In order to measure the force of adhesion at (C), the first electrode 310 was fixed to the horizontal plate, the upper separator 441 was fixed to the grip type jig, and the first electrode was pulled vertically so as to be peeled off from the upper separator, whereby the adhesive force was measured.

In order to measure the force of adhesion at (D), the third electrode 330 was fixed to the horizontal plate, the lower separator 442 was fixed to the grip type jig, and the third electrode was pulled vertically so as to be peeled off from the lower separator, whereby the adhesive force was measured.

In each of the first test and the second test, as adhesive force measurement experiment, the adhesive forces at (A) to (D) were measured twice for each of the tab portion, the lower portion, and the middle portion, and the results and average values are shown in the following table. The unit of adhesive force shown in the following table is gf/20 mm.

A universal testing machine (UTM) manufactured by Amtek was used as an adhesive force measurement device.

Referring to the following table, it can be seen that the adhesive force measured when the pressing force is high is higher than the adhesive force measured when the pressing force is low.

When the pressing force of the pressing roll is increased at the time of lamination, therefore, it can be expected that the force of adhesion between the electrode and the separator can be increased. Even though a gap is formed between the separator and the electrode, therefore, it is possible to secure the force of adhesion between the separator and the electrode by increasing the pressing force of the pressing roll.

| Target | Region | First test (190 kgf, 90° C.) Adhesive force (gf/20 mm) | | | Second test (170 kgf 90° C.) Adhesive force (gf/20 mm) | | |
|---|---|---|---|---|---|---|---|
| | | Primary | Secondary | Average | Primary | Secondary | Average |
| Second electrode-upper separator (A) | Tab | 17.03 | 13.471 | 15.2505 | 15.355 | 19.297 | 17.326 |
| | M | 11.617 | 16.892 | 14.2545 | 15.202 | 13.065 | 14.1335 |
| | Bottom | 42.724 | 38.021 | 40.3725 | 39.767 | 31.707 | 35.737 |
| Second electrode-lower separator (B) | Tab | 20.273 | 29.023 | 24.648 | 15.824 | 20.101 | 17.9625 |
| | M | 18.335 | 16.564 | 17.4495 | 18.389 | 11.712 | 15.0505 |
| | Bottom | 48.241 | 56.652 | 52.4465 | 33.751 | 26.541 | 30.146 |
| First electrode-upper separator (C) | Tab | 126.24 | 115.48 | 120.86 | 104.283 | 100.658 | 102.4705 |
| | M | 121.14 | 124.32 | 122.73 | 113.351 | 130.46 | 121.9055 |
| | Bottom | 131.259 | 98.551 | 114.905 | 109.425 | 95.82 | 102.6225 |
| Third electrode-lower separator (D) | Tab | 129.15 | 109.35 | 119.25 | 104.068 | 82.885 | 93.4765 |
| | M | 84.844 | 94.403 | 89.6235 | 72.022 | 85.334 | 78.678 |
| | Bottom | 162.5 | 162.68 | 162.59 | 144.05 | 139.76 | 141.905 |

Those skilled in the art to which the present invention pertains will appreciate that various applications and modifications are possible within the category of the present invention based on the above description.

DESCRIPTION OF REFERENCE SYMBOLS

110, 210, 310: First electrodes
120, 220, 320: Second electrodes
121, 221, 311, 321, 331: Electrode current collectors
122, 222, 312, 322, 332: Electrode mixture layers
130, 230, 330: Third electrodes
140, 240, 340, 441, 442: Separators
150, 251, 351: Pressing rolls
252, 352: Rotary shafts
253, 353: First pressing cylinders
263, 363: Second pressing cylinders
370: Controller
381, 383: First thickness measurement sensors
382, 384: Second thickness measurement sensors
383a, 384a: Radiation portions
383b, 384b: Receiving portions
390: Cutter
441: Upper separator
442: Lower separator

The invention claimed is:

1. A lamination apparatus for manufacture of an electrode assembly, the lamination apparatus comprising:
a pressing roll configured to press electrodes constituting the electrode assembly;
a rotary shaft configured to rotate the pressing roll;
a pressing cylinder configured to adjust a pressing force applied to the pressing roll; and
first and second thickness measurement sensors configured to respectively measure first and second thicknesses of an electrode mixture layer at opposite ends of one of the electrodes; and a controller configured to control the pressing force applied by the pressing cylinder when a difference occurs between the first thickness and the second thickness,
wherein the pressing roll is configured to more strongly press the electrode assembly at a first position at which the thickness of the electrode mixture layer of the one of the electrodes is smaller when the difference occurs between the first thickness the second thickness.

2. The lamination apparatus according to claim 1, wherein the pressing cylinder is a first pressing cylinder, the lamination apparatus further comprising a second pressing cylinder, the first pressing cylinder and the second pressing cylinder coupled to opposite ends of the rotary shaft, respectively.

3. The lamination apparatus according to claim 2, wherein the lamination apparatus is configured such that a first pressing force applied by the first pressing cylinder to the electrode assembly and a second pressing force applied by the second pressing cylinder to the electrode assembly are different from each other.

4. The lamination apparatus according to claim 1, wherein the electrode assembly is a bi-cell having a structure in which a first electrode, a separator, a second electrode, a separator, and a third electrode are sequentially stacked.

5. The lamination apparatus according to claim 1, further comprising:
a first electrode supply unit;
a second electrode supply unit; and
a third electrode supply unit,
wherein the one of the electrodes is a second electrode supplied from the second electrode supply unit.

6. The lamination apparatus according to claim 1, wherein each of the electrodes is a double-sided electrode having electrode mixtures coated on opposite surfaces of an electrode current collector thereof.

7. The lamination apparatus according to claim 6, wherein the thickness measurement sensor comprises:
a radiation portion configured to radiate a beta ray through the electrode; and
a receiving portion configured to sense the beta ray radiated by the radiation portion, and the radiation portion is configured to be disposed at a first one of an upper surface or a lower surface of the one of the electrodes while the receiving portion is disposed at a second one of the upper surface or the lower surface.

8. The lamination apparatus according to claim 6, wherein the pressing roll is an upper pressing roll, the lamination apparatus further comprising a lower pressing roll, and an upper pressing force configured to be applied to a first end and a second end of the upper pressing roll configured to be disposed at an upper surface of the electrode assembly are configured to be set independent of a lower pressing force configured to be applied to a first end and a second end of the lower pressing roll configured to be disposed at a lower surface of the electrode assembly.

9. The lamination apparatus according to claim 1, wherein the pressing roll is configured to be heated.

\* \* \* \* \*